Patented July 30, 1935

2,009,776

UNITED STATES PATENT OFFICE 2,009,776

COATING MATERIAL

Alfred L. Kronquest and Samuel C. Robison, Syracuse, N. Y., assignors to Continental Can Company, Inc., New York, N. Y., a corporation of New York No Drawing. Application March 5, 1931, Serial No. 520,464. Renewed May 7, 1935

6 Claims. (Cl. 106—23)

This invention relates to a coating material comprising a mixture of ingredients which may be prepared as a concentrated dough and later extended by a suitable liquid for the production of the coating material.

This material is particularly adapted for employment in sealing a container end to the body, and for example, may be employed as a coating in the groove or channel of a can end, so that during the sealing operation in assembling the can end upon a body, the coating material establishes a tight seal between the end and body.

One of the features of the present invention is the provision of a coating material and a dough for producing the same which is stable and not liable to rapid deterioration, and which may be readily extended by a volatile solvent to form a liquid coating material. This dough is of a putty-like consistency and is more easily handled and shipped than the coating material made therefrom.

Another object of the present invention is the provision of a coating material which solidifies rapidly and adheres well to the element upon which it is placed.

For the purpose of producing a coating material, an assemblage of various ingredients is initially made whereby a putty-like mass of dough is produced. This dough is shipped as such to the factory at which the coating material is to be employed: and is there extended by a suitable solvent to produce a coating material which is a uniform mass usually of the approximate consistency of thick cream.

A preferred formula for the manufacture of the dough is as follows:—

| | |
|---|---|
| Rubber solution | 100 lbs. |
| Zinc oxide | 100 lbs. |
| Adhesive ester gum | 15 lbs. 10 oz. |
| Liquid petrolatum | 3 lbs. 2 oz. |
| Anti-oxidant | 0 lbs. 5 oz. |
| Carbon black | 0 lbs. 2 oz. |
| | 219 lbs. 3 oz. |

The rubber solution employed contains approximately two pounds of rubber to four and one-half pounds of naphtha as a solvent. This rubber is incorporated to give elasticity to the compound and permit it to yield during the seaming operations and thus fill and pack the space between the can and cover. The zinc oxide is employed as an inert filler to reinforce the rubber.

The adhesive ester gum is a resinous material employed to effect the adhesion of the coating to the tin plate, and it has been found that the type commercially available under the name "Malay gum" is highly adhesive and satisfactory in the combination.

The liquid petroleum is a plasticizer for the rubber and gum and serves to make the material more plastic and pliable, and hence better adapted to fulfill its function of packing the space between the can and cover when so employed.

The anti-oxidant is employed to prevent deterioration of the rubber by oxidation. Various materials are adapted for this use, all serving to prevent the hardening of the mixture in the course of time. It has been found that the material commercially available under the name "Neozone C" (a mixture of 92.5% phenyl-alpha-naphthylamine and 7.5% meta-toluylenediamine) is excellently adapted for the purpose.

The carbon black is employed as a dye stuff.

The rubber solution is placed in the mixer and the other ingredients are then introduced and mixed until a uniform mass results, which is of a putty-like consistency and is here denominated "coating dough". When this dough is to be employed, it is again placed in a suitable mixer in the ratio of 100 pounds of dough to 16 gallons of a suitable volatile solvent, such as benzol, naphtha or other suitable organic solvent for the rubber, gum and petrolatum, and stirred until a uniform mass results usually having the consistency of a thick cream. It is obvious that greater or lesser proportions of solvent may be employed according to the exact consistency desired.

The coating material may then be placed upon the tin plate, where it rapidly evaporates and deposits an elastic film tightly adherent to the tin plate.

It is obvious that the invention may be modified in many ways, both as to the selection of ingredients and as to the quantities employed, without departing from the spirit of the appended claims.

Having thus described the invention, what we claim as new and desire to secure by Letters Patent, is:

1. A coating dough for producing a coating material comprising a mixture of 100 parts by weight of rubber solution containing approximately 30 parts by weight of rubber, approximately 15 parts by weight of adhesive ester gum, approximately 3 parts by weight of liquid petrolatum, and approximately 100 parts by weight of zinc oxide.

2. A coating dough of putty-like consistency including in combination 100 parts by weight of rubber solution containing 4½ parts by weight of naphtha and approximately 2 parts by weight of rubber, approximately 15 parts by weight of adhesive ester gum, 3 parts of liquid petrolatum, one-third part of an anti-oxidant for the rubber, and approximately 100 parts by weight of an inert filler.

3. A coating composition comprising a solution in a volatile rubber solvent of rubber, adhesive ester gum, a plasticizer for the rubber and gum, and an anti-oxidizing agent for the rubber, together with particles of an inert filler suspended in the solution, the quantity by weight of said filler being greater than the combined weight of the rubber and ester gum.

4. A coating composition comprising a solution in a volatile rubber solvent of rubber, adhesive ester gum, and a plasticizer for the rubber and gum, together with particles of an inert filler suspended in the solution, the quantity by weight of said filler being greater than the combined weight of the rubber and ester gum.

5. A coating composition comprising a solution in a volatile rubber solvent of substantially 30 parts by weight of rubber, substantially 15 parts by weight of adhesive ester gum, and a plasticizer for the rubber and gum, together with 100 parts of zinc oxide in the form of particles suspended in said solution.

6. A coating composition comprising a solution in a volatile rubber solvent of substantially 30 parts by weight of rubber, substantially 15 parts by weight of adhesive ester gum, a plasticizer for the rubber and gum, and an anti-oxidizing agent for the rubber, together with 100 parts of zinc oxide in the form of particles suspended in said solution.

ALFRED L. KRONQUEST.
SAMUEL C. ROBISON.